United States Patent

[11] 3,609,761

[72] Inventor Amedio D. Petrangelo
Webster, N.Y.
[21] Appl. No. 59,240
[22] Filed July 29, 1970
[45] Patented Sept. 28, 1971
[73] Assignee Stromberg-Carlson Corporation
Rochester, N.Y.

[54] VOLUME CONTROL AND SILENCING MECHANISM FOR RINGERS HAVING CLAPPER LOCKOUT
9 Claims, 9 Drawing Figs.

[52] U.S. Cl. .......... 340/402, 340/396
[51] Int. Cl. .......... H04g 3/00, H04g 3/10
[50] Field of Search .......... 340/402, 392

[56] References Cited

UNITED STATES PATENTS 2,141,775 12/1938 Jarley .......... 340/402

*Primary Examiner*—Harold I. Pitts
*Attorney*—Charles C. Krawczyk

ABSTRACT: A volume control and silencing mechanism for a ringer having a clapper under the gong includes a movable actuator for engaging a spring in contact with the inside of the gong for controlling the volume of the of the ringer and also for positioning a guide for limiting the clapper movement to silence the ringer. A lockout lever is provided to prevent the actuator from inadvertently silencing the ringer when the ringer volume is adjusted.

Amedio D Petrangelo
INVENTOR.

BY Charles C Krawczyk
Ann C. Williams
ATTORNEYS

Amedio D. Petrangelo
INVENTOR.

BY Charles ... Krawczyk
Ann C. Williams

ATTORNEYS

Amedio D. Petrangelo
INVENTOR.

BY Charles C. Krawczyk
Alan C. Williams

ATTORNEYS

VOLUME CONTROL AND SILENCING MECHANISM FOR RINGERS HAVING CLAPPER LOCKOUT

BACKGROUND OF THE INVENTION

This invention relates to a volume control and silencing mechanism for electromagnetic ringers in general, and more particularly to a volume control and silencing mechanism for telephone frequency ringers.

It has been a goal of the telephone industry to provide telephone subscribers with variations in the telephone sets to suit their individual needs. The ringer in the telephone set provides the signalling mechanism for notifying the subscriber of an incoming call. Therefore, it is desirable to provide means for the individual subscriber to control the loudness of the ringer or to silence the ringer by simple adjustments to suit his individual needs at a particular time. A loudness control mechanism must operate reliably for long periods of time and should include a safeguard to prevent the subscriber form inadvertently silencing the ringer when the subscriber is attempting to change the volume. Also, preferably the size of the ringer should not be increased by the addition of a volume control and silencing mechanism.

In the prior art, the volume of nonfrequency selective ringers was generally controlled by limiting the travel of the clapper by such devices as screw stops, levers carrying stops, and electromagnetic shunts. However, these devices are not satisfactory for use with frequency selective ringers. In frequency selective ringers, the armature assembly operating the clapper is made responsive to a selected frequency. Limiting the travel of the clapper affects the frequency response of the ringer and is, therefore, undesirable.

In the prior art, the volume control mechanisms for frequency selective ringers included various types of springs movably mounted outside the gong in a manner such that the spring can be moved to contact the outside of the gong to dampen the vibration (and thus reduce the volume). In some ringers, a screw stop has been provided to prevent inadvertent silencing of the ringer. When the screw is removed the ringer can be silenced.

The volume control and silencing mechanisms of the prior art ringers are not suitable for use in the modern miniaturized frequency selective ringers of the type wherein the clapper is positioned under the gong. Since the clapper is positioned under the gong, any silencing mechanism which limits clapper movement is also required to be located under the gong. In addition, since the size of the ringer is a limiting factor, it is also desirable if the volume control mechanism can be located under the gong to further reduce the space requirement of the ringer.

Accordingly, it is an object of this invention to provide a new and improved volume control mechanism for frequency selective ringers.

Another object of this invention is to provide a new and improved silencing mechanism for frequency selective ringers of the type wherein the clapper is positioned under the ringer gong.

An object of this invention is to provide a new and improved volume control and silencing mechanism for frequency selective ringers including means for insuring that the ringer is not inadvertently silenced.

BRIEF DESCRIPTION OF THE INVENTION

A volume control and silencing mechanism for a frequency ringer having a clapper under a gong has an actuator positionable to select the ringer volume or silence the ringer. A damping means is biased to contact the inside of the gong to dampen the ringer volume. The actuator is positionable to control the damping means. In addition, the actuator carries a limit means under the gong. By positioning the actuator, the limit means can be positioned to limit the clapper movement to prevent the clapper from striking the gong thus silencing the ringer. A rotatable lever means is provided to prevent the actuator from being positioned so that the ringer is not inadvertently silenced.

PREFERRED EMBODIMENT OF THE INVENTION

Figure 1:
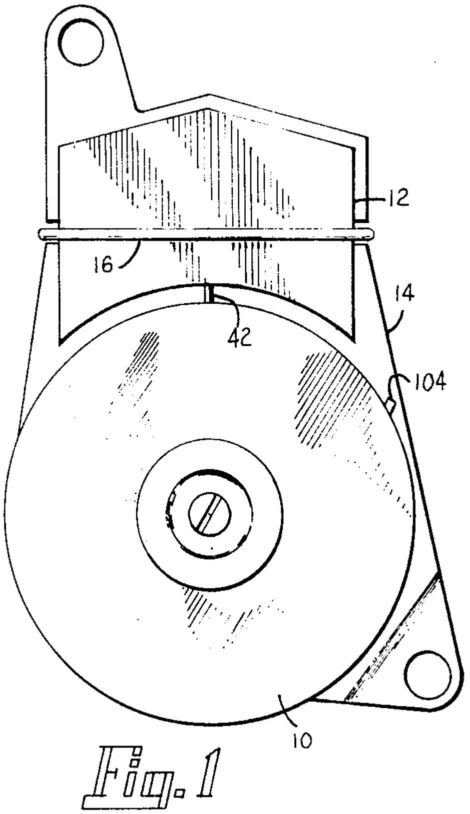
FIG. 1 shows a top view of a frequency selective ringer including the invention with the resonator mounted adjacent to the ringer gong.

Referring now to the drawings, a ringer assembly covered by a gong 10 and a resonator 12 are mounted on a support plate 14. The resonator 12 has an opening (not shown ) on the side adjacent to the gong 10. A spring clip 16 placed around the outside of the resonator 12 and partially under the support plate 14 attaches the resonator 12 to the support plate 14.

Figure 2:
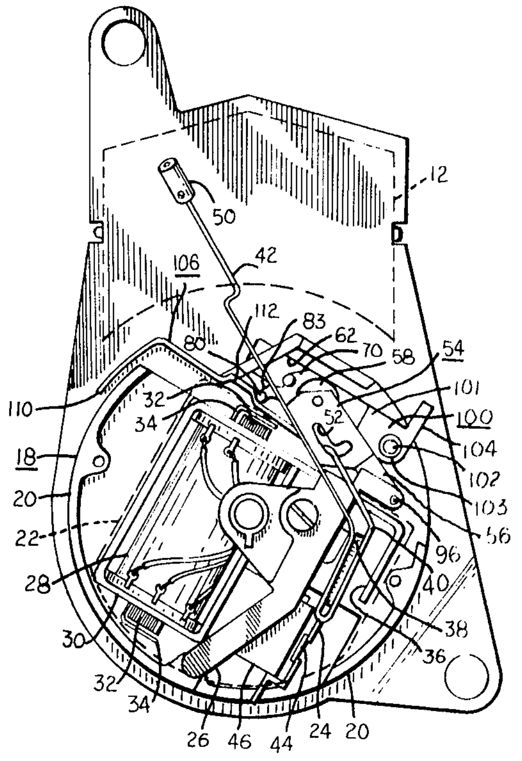
FIG. 2 shows the ringer of Figure 1 including the invention with the gong and the resonator removed.

The ringer assembly 18 (Figure 2) includes a nonmagnetic base plate 20 with an electromagnetic circuit 22 (within dotted lines in Figure 2) which operates an armature assembly 24. The ringer assembly 18 is covered by the gong 10. The gong 10 is attached to a pivot casting 26 which is supported by a mounting post (not shown) formed as part of the baseplate 20.

The electromagnetic circuit 22 includes a coil 28 encircled by a unitary pole piece 30. A laminated iron core 32 extends through the center of the coil 28. Retainer clips 34 hold the laminated core 32 in place. The ends of the core 32 project through apertures (not shown) in the pole piece 30. The pole piece 30 is shaped so that it butts against the coil 28 ends to obtain good magnetic coupling between the coil 28 and the pole piece 30. The pole piece 30 has a pair of spaced apart ends 36 (only one shown) which define an air gap.

An armature assembly 24 having a movable armature 38 which carries two rods 40 and 42 is connected at substantially the center of a reed spring 44. The armature 38 projects into the pole piece air gap and moves in the air gap in response to magnetic flux changes occurring between the armature 38 and the pole piece ends 36. A permanent magnet 46 is positioned close enough to one end of the armature 38 to magnetically polarize the armature 38. The other pole of the permanent magnet 46 abuts the unitary pole piece 30 to magnetically polarize the pole piece ends 36. The magnetized armature 38 rests in a position of equilibrium between the pole piece ends 36. When the coil 28 is energized by an *a-c* signal, the magnetic flux induced in the pole piece 30 interacts with the magnetic flux of the permanent magnet 46 to cause the armature 38 to swing back and forth between the pole piece ends 36 at the frequency of the applied *a-c* signal.

The armature 38 carries two rods 40 and 42, both of which move as the armature 38 moves. The rod 42 extends out from under the gong 10 and into the resonator 12 through the aperture (not shown) in the resonator 12. The rod 42 is adapted to carry a weight 50 within the resonator 12. Positioning the weight 50 on the rod 42 is used to maximize the resonant response of the armature assembly 24 to a predetermined magnetic flux change.

Figure 5:
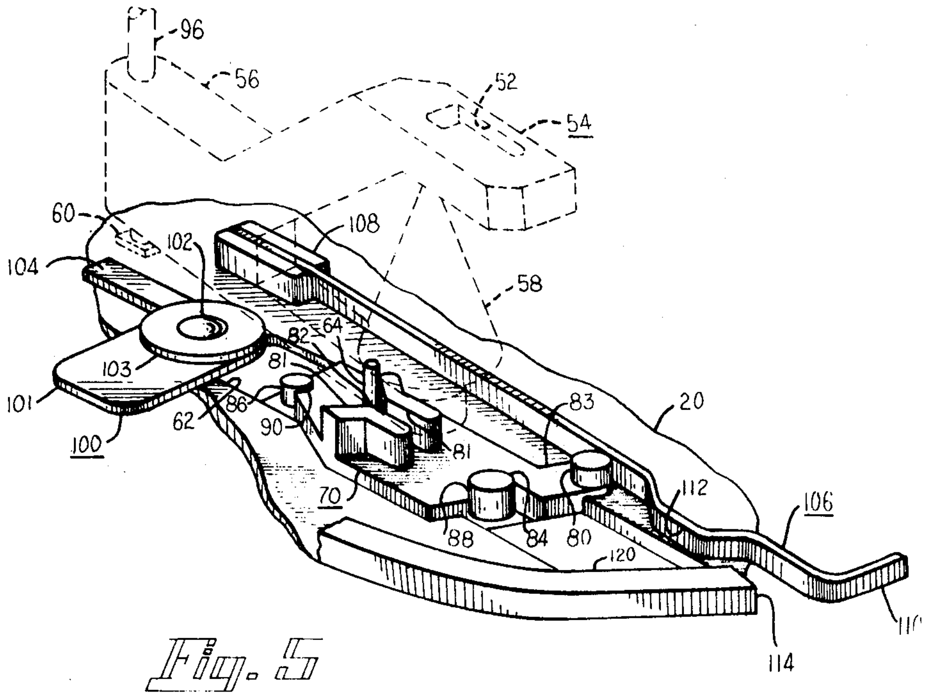
Figure 5 shows a perspective view of the volume control and silencing mechanism of the invention with the clapper assembly shown in phantom and the actuator positionable to silence the ringer.

The rod 40 engages a slot 52 in the clapper assembly so that movement of the rod 40 drives the clapper assembly 54. The clapper assembly 54 includes a frame 56 for carrying a clapper 58. One end of the frame 56 is pivotally mounted between a post 60 (Figure 5) formed as part of the baseplate 20 and the pivot casting 26. The slot 52 and the clapper 58 are spaced away from the pivotally connected end of the frame 56 so that sufficient movement of the rod 40 in the slot 52 will move the clapper assembly 54 to drive the clapper 58 against the gong 10. A projection 64 (shown in Figure 3) from the bottom of the clapper frame 56 is positioned near the clapper 58. This projection 64 will be described later in connection with the silencing mechanism of the ringer.

In order to get the clapper 58 to strike the gong 10, there must be sufficient amplitude of movement of the armature 38. The amplitude of movement of the armature 38 is determined by the resonant response of the armature assembly 24 to the coil 28. When the resonant frequency is applied to the coil 28, the movement of the armature assembly 24 is maximized thus causing the clapper 58 to strike the gong 10. When a signal other than the resonant frequency is applied to the coil 28, the movement of the armature assembly 24 is insufficient to cause the clapper 58 to strike the gong 10.

A more detailed explanation of the operation of a frequency selective ringer which utilizes the above-described armature assembly and means of maximizing its movement, clapper assembly and electromagnetic circuit can be found in copending U.S. Pat. application Ser. No. 887,051, filed on Dec. 22, 1969 for Robert W. Collier, and entitled "Compact Frequency Selective Ringer". This ringer is a suitable ringer for utilizing the following described volume control and silencing mechanism of the invention.

A volume control and silencing mechanism includes an actuator 70 slideably mounted in a slot or guide 62 in the base plate 20. The actuator 70 extends through an opening in the support plate 14. The actuator 70 is positionable to control the ringing loudness or to silence the ringer. The actuator 70 includes an elongated cam surface 72 (shown in Figure 3) that fits into a slot 62 formed in the base plate 20. For simplicity, only the slot 62 in the baseplate 20 will be described. The actuator 70 includes two attachable portions 74 and 76 as shown in the exploded view of Figure 3. The lower portion 74 of the actuator 70 has a cylindrical projection 78 providing a handle for enabling the subscriber to slide the actuator 70 back and forth along the direction of the slot 62 to adjust the loudness of the ringer, or to silence the ringer. The upper portion 76 of the actuator 70 has a pair of angular guide walls 81 extending toward the clapper assembly 54 which define a converging channel 82 wherein the narrow portion of the channel has a wall separation slightly greater than the diameter of the projection 64 on the clapper assembly 54. In addition, the upper portion 76 of the actuator 70 has an arm or extension 83 including a cylindrical cam surface 80 at the end of the arm 83.

The upper and lower portions 76 and 74 of the actuator 70 are designed to be mating parts. The lower portion 74 includes a pair of cylindrical positioning projections 84 and 86, one near each end. The upper portion 76 of the actuator 70 has two openings 88 and 90 designed to mate with the two positioning projections 84 and 86 when the actuator 70 is assembled.

Figure 9:
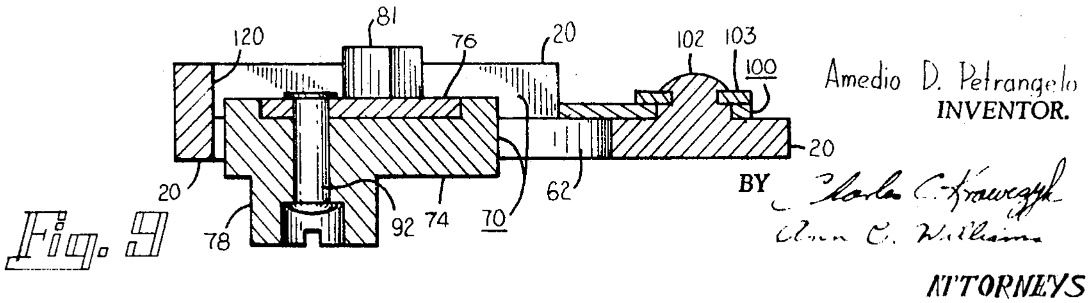
FIG. 9 is a cross-sectional view taken along the line 9—9 of Figure 6 showing the actuator assembled in the slot in the base plate and the lockout lever pivotally mounted to the base plate.

To assemble the actuator 70 the lower portion 74 of the actuator 70 is inserted into the back of the ringer so that the cam surface fits into the slot 62 with the projections 84 and 86 extending into the ringer. The upper portion 76 of the actuator 70 is positioned on the baseplate 20 so that the openings 88 and 90 mate with the cylindrical positioning projections 84 and 86, respectively. A rivet 92 (Figure 3) or other fastening means is used to connect the upper and lower portions (as shown in Figure 9).

Figures 3, 4:
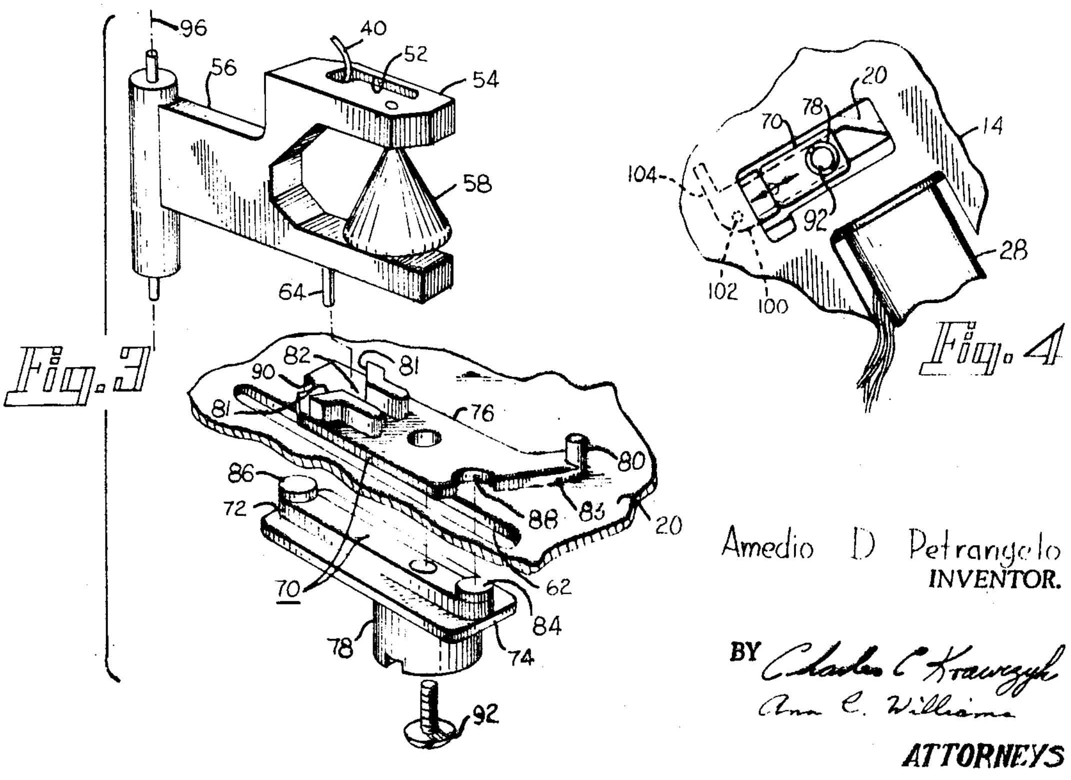
FIG. 3 is an exploded view of the clapper assembly and a portion of the volume control and silencing mechanism of the invention.
FIG. 4 shows a bottom view of a portion of the ringer of Figures 1 and 2 showing the actuator of the volume control, silencing mechanism, and the slot in which it is positionable with the lockout lever shown in phantom.

As can be seen in Figure 3, the pivotally mounted clapper frame 56 includes a projection 64 adjacent the clapper 58 that extends toward the baseplate into the path of movement of the actuator 70. As the actuator 70 is moved to silence the ringer, the projection 64 fits into the narrow portion of the converging substantially Y-shaped channel 82 (Figure 3) so that movement of the projection is greatly limited and the clapper 58, therefore, cannot strike the gong 10.

An L-shaped lockout lever 100 is pivotally connected to a projection 102 extending from the base plate 20 with a locking washer 103. The lever 100 includes an arm 104 that extends out from under the gong 10 providing access for the subscriber to selectively position the lockout lever 100. In the position illustrated in Figures 2, 6 and 7, the arm 101 of the lever 100 covers a portion of the slot 62, so that the actuator 70 cannot be moved to that end of the slot 62 (illustrated in Figure 4). Hence, the actuator cannot be moved to a position wherein the converging channel 82 captures the projection 64. If the lockout lever arm 104 is rotated to the position shown in Figure 8, the arm 101 is pivoted away from the slot 62 and the actuator 70 can be positioned at the end of the slot 62 wherein the converging channel 82 captures the projection 64 to silence the ringer. The channel 82 has a converging shape to allow variations in the position of the clapper projection 64 when the actuator 70 is moved into position to silence the ringer.

Figure 7:
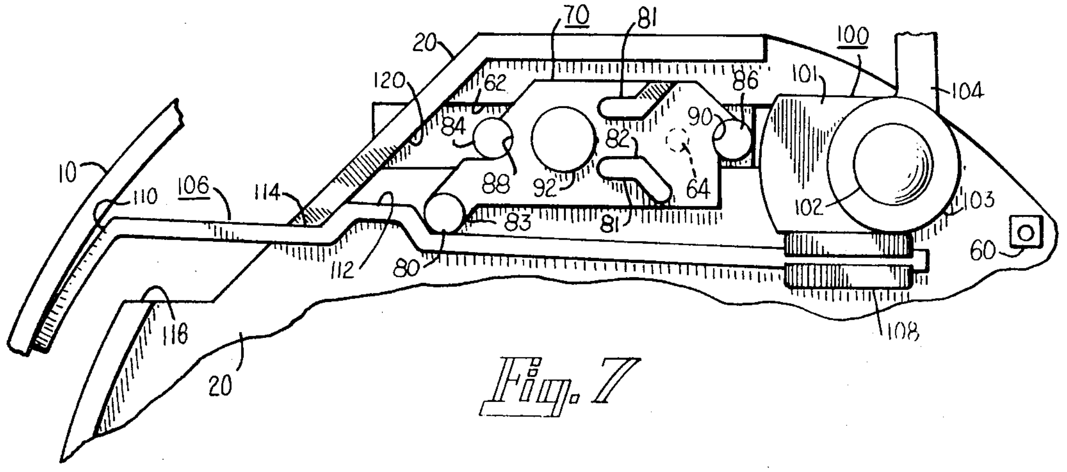
FIG. 7 shows the actuator positioned in the slot so that the leaf spring rests against the gong to allow damped ringing volume and the lockout lever positioned to prevent silencing the ringer.
Figures 6, 8:
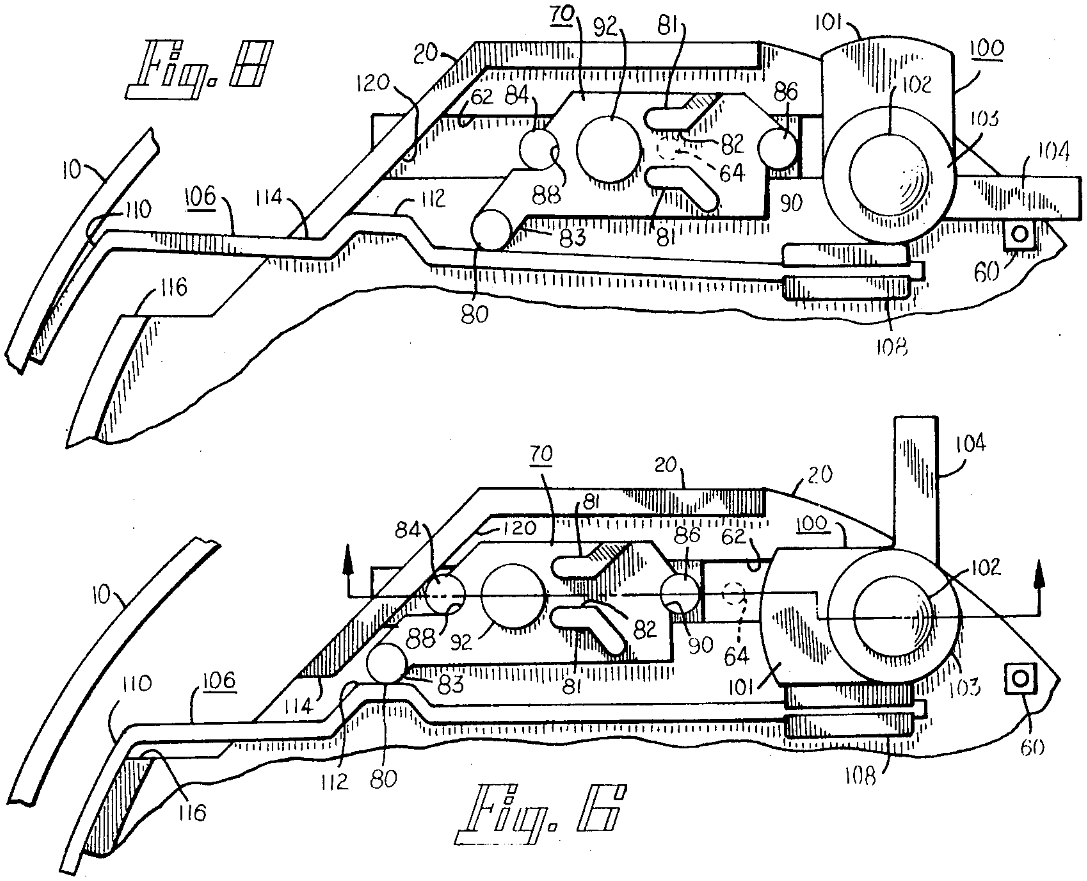
FIG. 6 shows the movable actuator positioned in the slot so that the leaf spring is away from the gong and the lockout lever is in position to prevent silencing of the ringer.
FIG. 8 shows the lockout lever in position to permit the movable actuator to be positioned wherein the clapper assembly movement is limited, thereby silencing the ringer.

An elongated leaf spring 106 is mounted at one end to a post 108 formed in the baseplate 20 (see Figures 6,7 and 8). The spring 106 extends in the direction of the slot 62 and adjacent to the actuator 70. The spring 106 is positioned to resiliently contact the gong 10. The end 110 of the spring 106 is adapted to contact the gong 10 and has a substantially L-shaped contact surface which reduces the volume when in contact with the gong 10.

The spring 106 has a U-shaped bend 112 formed in it. The cylindrical cam 80 on the arm 83 can be positioned in response to the movement of the actuator 70 to contact the bend 112 and force the spring 106 away from contact with the gong 10 as illustrated in Figure 6.

Two stopes 114 and 116 formed in the baseplate 20 are provided to limit the range of movement of the spring 106. The spring 106 is resiliently biased in a direction to contact the stop 114 when the actuator is in the position shown in Figures 7 and 8 wherein the spring also contacts the gong 10. When the arm 83 of the actuator 70 forces the spring 106 away from the gong 10 (Figure 6), the spring 106 rests against the stop 116.

In operation, the actuator 70 can slide along the slot 62 to three positions, each of which corresponds to a different mode of ringer operation. In the first position of the actuator 70 (Figure 6), the end of the actuator 70 is located near to, or in contact with, the stop 120 formed in the baseplate 20. In this position, the cylindrical surface 80 of the extension 83 of the actuator 70 presses against the U-shaped portion 112 of the leaf spring 106 to force the spring 106 away from the gong 10 to allow the gong 10 to produce maximum ringing volume when the ringer is energized.

In the second position of the actuator 70 (Figure 7), the actuator 70 is positioned so that the extension 83 does not engage the U-shaped bend 112 and wherein the spring 106 contacts the gong 10 to dampen the ringing volume.

In both the first and second positions, the lockout lever 100 is positioned to prevent the actuator from moving to the third position (Figure 8) wherein the ringer is silenced. Before the actuator 70 can move to its third position, the lockout lever 100 must be moved to pivot the arm 101 away from the slot 62. In the third position, the actuator 70 is positioned so that the projection 64 from the clapper assembly 56 (shown in phantom in Figure 8) is captured in the channel 82 so that the clapper 58 cannot move sufficiently to strike the gong 10 and, therefore, the ringer is silenced.

As can be seen in Figure 1, the arm 104 of the lockout lever 100 projects from under the gong 10 and is readily accessible. This arm 104 provides a means for rotating the lockout lever 100 to either of its two positions (as shown in Figures 6 and 7 or Figure 8). The lockout lever 100 in the position shown in Figure 8, allows the actuator 70 to slide into its extreme right-hand (third) position wherein the channel 82 captures the projection 64 to silence the ringer. In this position the post 60 mounted on the baseplate 20 acts as a stop for the lever arm 104. In order to avoid inadvertent silencing of the ringer, the lockout lever 100 is pivoted into its second position, as illustrated in Figures 6 and 7, wherein the arm 101 of the lever acts as a limit stop for the movement of the actuator 70 by covering a portion of the slot 62, so that the actuator 70 cannot be moved to the third position wherein it silences the ringer. In the second position of the lever 100, the post 108 acts as a stop.

The ringer volume can be selected by positioning the actuator 70 in any of the three positions by means of handle 78 projecting from the bottom of the ringer baseplate 20. The arm 104 of the L-shaped lever 100 projects out from under the gong 10 so that the lever 104 is accessible to be used to pivot the lever 100 in either of the two positions.

Thus, it can be seen from the foregoing description that the volume control mechanism of the invention does not affect the clapper movement and, therefore, does not affect the frequency response of the ringer. In addition, a silencing mechanism has been provided for frequency selective ringers including means which does not require the use of extra tools or removable parts for insuring that the ringer is not inadvertently silenced. The novel volume control and silencing mechanism for frequency selective ringers disclosed herein fits neatly under the gong so that the size of the ringer is not increased. It is simple to operate, easily accessible, and very reliable. This novel volume control and silencing mechanism for frequency selective ringers can easily be operated by the subscriber with the assurance that the desired ringing volume has been correctly selected.

What is claimed is:

1. A volume control and silencing mechanism for a frequency selective electromagnetic ringer having a base supporting a frame carrying a clapper covered by a gong comprising:

damping means mounted on said base for damping the volume of said ringer gong by engaging the inside of the gong;

actuator means slidably mounted in said base to extend under said gong so that said actuator means is positionable to control said damping means, and limit means on said actuator so that said actuator is positionable to engage said clapper frame to prevent said clapper from striking said gong.

2. A volume control and silencing mechanism as set forth in claim 1 wherein:

a portion of said actuator extends from said ringer to provide means for positioning said actuator;

said clapper frame includes a projection, and said limit means includes a pair of walls forming a channel on a portion of said actuator under said gong for capturing said projection.

3. A volume control and silencing mechanism as set forth in claim 2 including:

a lever having an arm extending out from under said gong, said lever being pivotally mounted to said base so that movement of said arm to a first position provides a stop for limiting the motion of said actuator and movement of said arm to a second position allows said actuator to be positioned to capture said projection in said channel.

4. A volume control and silencing mechanism as set forth in claim 2 wherein:

said actuator has an extension arm, and said damping means is a leaf spring having a bent portion extending toward said extension arm, the arrangement being such that said extension arm engages said bent portion to disengage said spring from said gong.

5. A volume control and silencing mechanism as set forth in claim 2 wherein:

said pair of walls define a substantially Y-shaped channel.

6. A frequency ringer comprising:

a baseplate;

an electromagnetic circuit mounted on one side of said baseplate;

a frame carrying a clapper mounted on said side of said baseplate, said frame having a projection;

an armature assembly mounted on said side for moving said frame to drive said clapper in response to the energization of said electromagnetic circuit;

a gong supported on said side of said baseplate, said gong covering said electromagnetic circuit, said armature assembly and said clapper, so that said clapper strikes the inside of said gong in response to the energization of said electromagnetic circuit;

spring means mounted under said gong so that an end of said spring means is resiliently biased to contact the inside of said gong to provide a damping effect;

an actuator slideably mounted on said base, said actuator having a limit means and an extension arm, said actuator being slideable to a first position wherein said extension arm engages said spring means to force said spring means out of contact with said gong, a second position wherein said actuator disengages said spring means to allow said spring means to contact said gong, and a third position wherein said limit means on said actuator engages said projection to prevent said clapper from striking said gong, and a movable stop mechanism for selectively limiting the movement of said actuator to said third position.

7. A frequency ringer as set forth in claim 6 wherein:

said limit means is a pair of walls forming a channel shape to capture said projection to prevent said clapper from striking said gong, and said movable stop mechanism is a lever with a portion extending out between said gong and said side of said baseplate for operation of said lever from outside said gong.

8. A frequency ringer as set forth in claim 7 wherein:

a portion of said actuator extends through said baseplate so that said actuator can be positioned from the outside of the ringer.

9. A telephone frequency ringer comprising:

a gong;

a baseplate;

an electromagnetic circuit mounted on said baseplate;

an armature assembly mounted on said baseplate;

a clapper assembly mounted on said baseplate under said gong, said clapper assembly being coupled to said armature assembly so that said armature assembly drives said clapper to strike the inside of said gong in response to the energization of said electromagnetic circuit;

a projection on said clapper assembly;

spring means in contact with the inside of said gong to damp the sound volume of said gong;

movable means projecting through said baseplate, said movable means being positionable from outside said ringer to any of three selectable and sequential positions so that in a first position said movable means positions said damping means out of contact with said gong to allow the ringer to have full ringing volume, in a second position said spring means is allowed to contact said gong so that said gong has a damped ringing volume;

a pair of walls forming a Y-shaped channel formed on said movable means, so that when said movable means is in the third position, said channel captures and holds said projection so that said clapper is prevented from striking said gong thus silencing said ringer, and lever means positionable to prevent said movable means from being placed in said third position.